(12) United States Patent
Hrabal

(10) Patent No.: US 10,124,636 B2
(45) Date of Patent: Nov. 13, 2018

(54) DEVICE FOR ADJUSTMENT OF PRESSURE IN TIRES

(75) Inventor: Frantisek Hrabal, Prague (CZ)

(73) Assignee: CODA Innovations s.r.o., Prague (CZ)

( * ) Notice: Subject to any disclaimer, the term of this patent is extended or adjusted under 35 U.S.C. 154(b) by 653 days.

(21) Appl. No.: 12/918,690

(22) PCT Filed: Feb. 20, 2009

(86) PCT No.: PCT/CZ2009/000022
§ 371 (c)(1),
(2), (4) Date: Aug. 20, 2010

(87) PCT Pub. No.: WO2009/103252
PCT Pub. Date: Aug. 27, 2009

(65) Prior Publication Data
US 2010/0326578 A1 Dec. 30, 2010

(30) Foreign Application Priority Data

Feb. 21, 2008 (CZ) .................................. PV 2008-97
Mar. 7, 2008 (CZ) ................................ PV 2008-143

(51) Int. Cl.
*B60C 23/12* (2006.01)
*B60C 29/06* (2006.01)

(52) U.S. Cl.
CPC .............. *B60C 23/12* (2013.01); *B60C 29/06* (2013.01); *Y10T 137/36* (2015.04)

(58) Field of Classification Search
CPC ......... B60C 23/12; B60C 29/00; B60C 29/04; B60C 23/10; B60C 29/06; F04B 35/00;
(Continued)

(56) References Cited

U.S. PATENT DOCUMENTS 407,971 A * 7/1889 Siersdorfer ............. F16K 31/44
137/140
638,628 A * 12/1899 Everett et al. .......... B60C 23/12
152/425
(Continued)

FOREIGN PATENT DOCUMENTS

DE 3433318 A1 3/1986
WO 03049958 A 6/2003
(Continued)

OTHER PUBLICATIONS

International Search Report for corresponding International Application PCT/CZ2009/000022.

*Primary Examiner* — Craig J Price
(74) *Attorney, Agent, or Firm* — WRB-IP LLP

(57) ABSTRACT

A device for adjustment of pressure in tires includes a chamber with shape memory and a valve. The valve is a three-way valve with inputs interconnected with the external environment and the tire internal space. One input is fitted with a valve, the next input is connected to one end of the chamber with shape memory, and the last input is interconnected with the closure element. The device includes the chamber with shape memory interconnected with the external environment through an input and with the tire chamber through an output and fitted with at least one valve. The length of the chamber in the direction of tire rotation equals 0.001 to 0.5 times the tire perimeter, where the volume of the chamber before deformation to volume of the chamber during deformation ratio is the same or higher than the desired tire pressure to pressure of the external environment ratio.

28 Claims, 8 Drawing Sheets

(58) Field of Classification Search
CPC .. F04B 9/127; Y10T 137/36; Y10T 137/2224; Y10T 137/8663; Y10T 152/10495
USPC ............ 137/224, 833, 625.66; 152/418, 419, 152/426; 417/233
See application file for complete search history.

(56) References Cited

U.S. PATENT DOCUMENTS

| | | | |
|---|---|---|---|
| 655,932 A * | 8/1900 | Laviers | B60C 23/12 152/425 |
| 706,021 A * | 8/1902 | Claesgens et al. | B60C 23/12 152/426 |
| 1,050,886 A * | 1/1913 | Wetherell | B60C 23/12 152/426 |
| 1,163,219 A * | 12/1915 | Cleaver | B60C 23/12 152/426 |
| 1,250,223 A * | 12/1917 | Rawdon | B60C 23/12 152/426 |
| 1,348,111 A * | 7/1920 | Hayford | B60C 23/12 152/426 |
| 2,021,646 A * | 11/1935 | Crandall | B60C 23/12 152/425 |
| 2,206,737 A * | 7/1940 | Tomsic | 137/224 |
| 2,420,224 A * | 5/1947 | Victor | B60C 23/12 152/426 |
| 3,860,054 A * | 1/1975 | Prottey | B60C 17/00 137/68.23 |
| 4,067,376 A * | 1/1978 | Barabino | B60C 23/004 116/266 |
| 4,570,691 A * | 2/1986 | Martus | 152/418 |
| 4,651,792 A * | 3/1987 | Taylor | B60C 23/12 141/198 |
| 4,922,984 A * | 5/1990 | Dosjoub | B60C 23/004 152/415 |
| 6,019,113 A * | 2/2000 | Allston et al. | 137/1 |
| 6,252,498 B1 * | 6/2001 | Pashayan, Jr. | B60C 23/0408 340/447 |
| 7,014,922 B2 * | 3/2006 | Riva et al. | 152/451 |
| 7,117,731 B2 * | 10/2006 | Hrabal | 73/146 |
| 7,322,392 B2 * | 1/2008 | Hawes | 152/419 |
| 7,748,405 B2 * | 7/2010 | Ghorbal et al. | 137/596.17 |
| 7,784,513 B2 * | 8/2010 | Loewe | B60C 23/004 152/418 |
| 7,911,332 B2 * | 3/2011 | Caretta et al. | 152/418 |
| 8,186,402 B2 * | 5/2012 | Eigenbrode | B60C 23/12 152/415 |
| 8,344,868 B2 * | 1/2013 | Browne et al. | 152/415 |
| 8,573,270 B2 * | 11/2013 | Hinque | B60C 23/12 152/419 |
| 8,651,155 B2 * | 2/2014 | Hinque | B60C 23/0493 152/418 |
| 8,662,127 B2 * | 3/2014 | Hinque | B60C 23/12 152/418 |
| 8,701,726 B2 * | 4/2014 | Hinque | B60C 23/12 152/450 |
| 8,857,484 B2 * | 10/2014 | Hinque | B60C 23/12 152/419 |
| 9,061,556 B2 * | 6/2015 | Hinque | B60C 23/12 |
| 9,126,462 B2 * | 9/2015 | Hinque | B60C 23/12 |
| 9,381,780 B2 * | 7/2016 | Hinque | B60C 23/12 |
| 2005/0126273 A1 * | 6/2005 | Hrabal | B60C 23/12 73/146 |
| 2006/0021690 A1 * | 2/2006 | Bunker | B60C 23/12 152/419 |
| 2006/0096637 A1 * | 5/2006 | Maquaire et al. | 137/224 |
| 2006/0283534 A1 * | 12/2006 | Hawes | 152/415 |
| 2007/0277877 A1 * | 12/2007 | Ghorbal et al. | 137/67 |
| 2012/0285596 A1 * | 11/2012 | Hrabal | 152/418 |
| 2015/0096657 A1 * | 4/2015 | Bennett | B60C 23/12 152/419 |
| 2016/0046159 A1 * | 2/2016 | Lin | B60C 23/12 152/450 |
| 2016/0243776 A1 * | 8/2016 | Michel | B60C 23/12 |
| 2017/0015148 A1 * | 1/2017 | Serret Avila | B60C 23/004 |

FOREIGN PATENT DOCUMENTS

| | | |
|---|---|---|
| WO | 2005012009 A | 2/2005 |
| WO | 2007134556 A | 11/2007 |

* cited by examiner

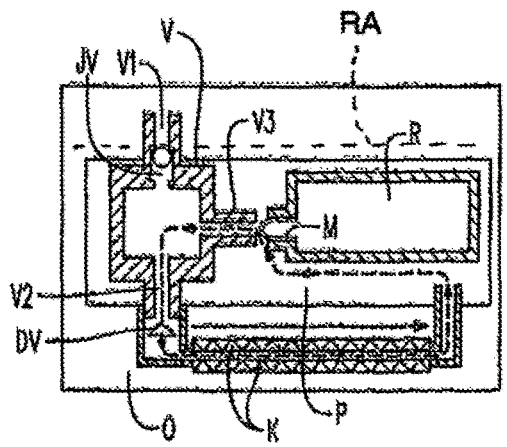
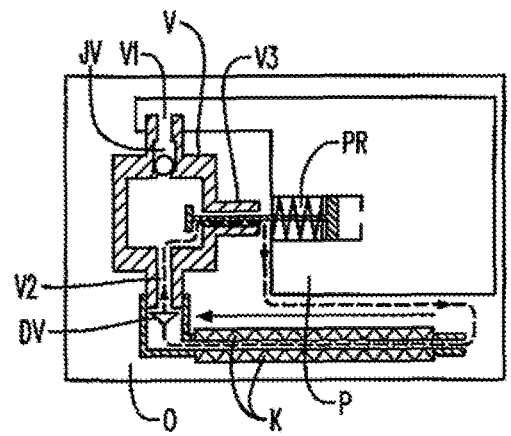
FIG. 9A
FIG. 9B
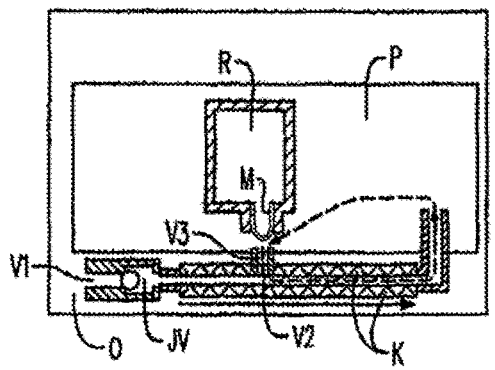
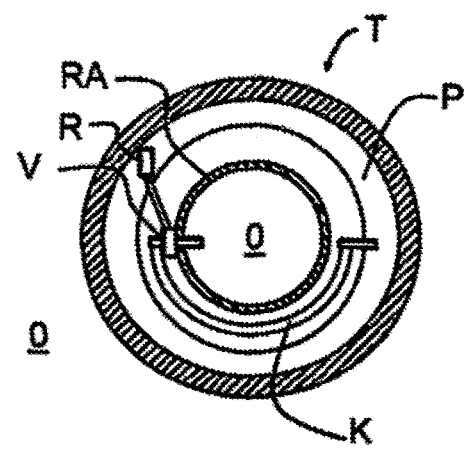
FIG. 10
FIG. 15

DEVICE FOR ADJUSTMENT OF PRESSURE IN TIRES

BACKGROUND AND SUMMARY

A device is described that adjusts the pressure in tires. The device consists of or comprises a chamber with shape memory, which is a part of the tire or adjacent to the tire wall, and of a valve. Eventually the device consists of or comprises a chamber with shape memory interconnected with the external environment through an input and with the tire chamber through an output, and fitted with at least one valve.

Various solutions for refilling pressure in the tire are currently known. For example, it is a tire fitted with an air feed connected to an external pressure source. Disadvantages of these solutions are extensive purchase costs and complexity of the particular device.

Self-reinflating tires are known too. For instance, an exemplary self-reinflating tire is described in patent applications CZ PV 2002-1364 and CZ PV 2001-4451. The air feed chamber is located in the tire wall or next to it. With the tire deformation advancing by rolling the chamber is periodically completely pressed down or broken across the chamber. Advancing compression of the chamber down to zero cross-section pushes ahead the medium contained within the chamber, thus creating a vacuum behind. The hose-shaped chamber located along the tire perimeter in its wall or next to it works as a peristaltic pump.

A disadvantage of these solutions is unsolved regulation, or, in case of setting the output pressure through the compression ratio in the chamber, a slow inflation. Because the closer the tire pressure gets to the chamber output pressure the smaller amount of air per rotation is pushed into the tire. For setting the output pressure through the chamber compression ratio, it is also disadvantageous to create the chamber along the whole tire perimeter as the chamber should be fully through-going, i.e. not loaded by deformation, at least once in a rotation. The device from this invention eliminates such disadvantages.

Also precise location of the chamber and its length are not solved, while these parameters are essential for proper functioning. To function properly, the peristaltic chamber needs to close gradually lengthwise in all its length, which is difficult to keep in a vibrating tire. The above-mentioned chambers are constantly under load due to variations in pressure in the chamber at least within the range of the difference between the pressure in the tire and its surrounding, but often more than that. Thus the chamber and its parts are stressed extremely as this occurs a many million times during the tire life. Also, these solutions do not deal with the difference caused by alteration in the tire pressure due to its heating, when the chamber output pressure corresponds to the desired pressure only if the tire temperature is identical with the set temperature of the tire. Thus the chamber works only for a limited number of cycles and/or works and inflates inaccurately. Movable mechanical parts are subject to the effects of centrifugal and other disturbing forces that moreover vary, which influences the accuracy of their behavior or can make the function of the device totally impossible or even cause a failure and destruction of the tire as such. The device from this invention eliminates such disadvantages.

The above-mentioned drawbacks are eliminated "to a high degree using the device for tire pressure adjustment, which consists of or comprises a chamber with shape memory and a valve, according to this invention. This valve is a three-way valve with inputs interconnected with the external environment and the tire internal space. One input is fitted with a valve, the next input is connected to the chamber with shape memory, and the last input is interconnected with a closure element.

In an effective arrangement, the input of the three-way valve fitted with a valve is interconnected with the external environment, the next input connected to the chamber with shape memory is interconnected with the tire internal space, and the last input with a closure element is interconnected with the tire internal space.

In another effective arrangement, the input of the three-way valve fitted with a valve is interconnected with the tire internal space, the next input connected to the chamber with shape memory is interconnected with the external environment through the chamber, and the last input with a closure element is interconnected with the external environment through the closure member.

An auxiliary one-way valve can be placed between the three-way valve and the chamber with shape memory.

The valve according to this solution allows creating the chamber along the whole tire perimeter. It also allows reaching high compression ratio of the inflating device during inflation seeing that out of inflation phases it lets the air circulate freely between the chamber and the external environment or the chamber and the tire internal space-. Only for the period of inflation, it will disconnect this circuit and the rate of inflating can thus be given just by the compression ratio of currently working parts of the device. Theoretically then, up to 100% of the chamber volume can be used for inflation, even without so-called dead volumes. Further, in case the described circulation in the non-inflation period was not enabled there would be constant cyclic increase of pressure or under-pressure in the chamber, and thus also constant stressing and potential destruction. The chamber, e.g. in a passenger car, runs through the cycle approx. 500 times in every kilometer and many million times in its lifetime; so it is advisable to eliminate any unnecessary load. In the device according to this patent, there is approximately equal pressure in all parts of the chamber unless inflation is just going on. If the average number of kilometers driven is 32,000 km per car per year and the average pressure leak is 12% per year, where the pressure leak can be eliminated by driving 12 km with this device, the loading of the chamber decreases to 12/36,000, i.e. to 0.03% compared to devices that do not allow this circulation. That is a huge advantage.

Also, to a great extent, the above-mentioned shortcomings are alternatively eliminated by the device for adjustment of the pressure in tires, consisting of or comprising a chamber with shape memory interconnected with the external environment through an input and with the tire chamber through an output, and fitted with at least one valve, according to this invention. In its principle, the chamber length in the direction of the tire rotation equals 0.001 to 0.5 of the tire perimeter, while the chamber volume before deformation to chamber volume at deformation ratio is at least the same as desired tire pressure to ambient pressure ratio.

Effectively, the chamber input is fitted with a valve and the output is interconnected with the closure element; alternatively the chamber output is fitted with a valve and the input is interconnected with the closure element.

The closure element can consist of a closure member connected to one chamber wall, with a shape matching the opening in the opposite wall.

Effectively, the closure element consists of or comprises an element with reference pressure and/or spring and/or membrane and/or piston and/or electronic element for closing the input of the three-way valve or input and/or output of the chamber and/or discharge hole.

Effectively, the closure member in the one-way valve and/or closure member in the shut-off valve has an option of free movement only in the direction perpendicular to centrifugal forces and/or in the direction parallel to the rotation axis.

Effectively, the closure element is fitted with a mechanism for setting the distance of the closure element from the three-way valve input or input and/or output of the chamber and/or discharge hole. Alternatively, the closure element can be fitted with an additional closure element located at the output valve interconnected with the external environment.

The chamber is interconnected with the accumulator that is next interconnected with the internal space.

The invention also concerns the tire and/or rim, which is fitted with the above-mentioned device.

Advantage of this solution, according to the invention is precisely defined length, volume, and location of the chamber. The solution according to the invention will further ensure proper inflating even in different temperatures of the tire in run and will unload the chamber from useless loading, where the chamber will only be loaded in moments when the tire is under-inflated, which decreases the load of the chamber and its wearing m the order of multiples of thousands. The chamber needs not fully close as in the previous solutions, which further increases the number of successful cycles of the chamber. The valve eliminates centrifugal and disturbing forces, thus further decreasing the risks of damage to the tire. The device is simple both for functioning and production, which determines its extreme reliability and low production and implementation costs.

The manufacture of this device is very simple; in its simplest configuration, it is only a simple valve fitted with an empty air-filled box with a membrane. Yet, it can be used to change the pressure as necessary, during assembly as well as in operation. The device is very simple and so its manufacture is inexpensive. Yet, it is reliable even under very difficult conditions of a rotating tire. The device can also provide right inflation even when pressure in the tire changes due to warming of the tire.

BRIEF DESCRIPTION OF THE DRAWINGS

The device for adjustment of pressure in tires according to this invention will be described in more details on particular examples of designs with the use of the drawings attached, where

FIG. 7a through 7k show in a schematic view different solutions that allow setting of the closure element's distance.

FIGS. 9a and 9b show in a schematic view the solution from FIGS. 1 and 2 fitted with an auxiliary one-way valve.

FIG. 10 shows in a schematic view an exemplary design in the position, when the tire pressure is at the set value and the second and last inputs are located deeper in the chamber.

Diagrammatic

Diagrammatic

FIG. 15 schematically shows a wheel including a tire and rim according to an aspect of the present invention.

DETAILED DESCRIPTION

For illustration, the invention will be described on individual examples of its arrangement.

Example 1

Figure 1A:
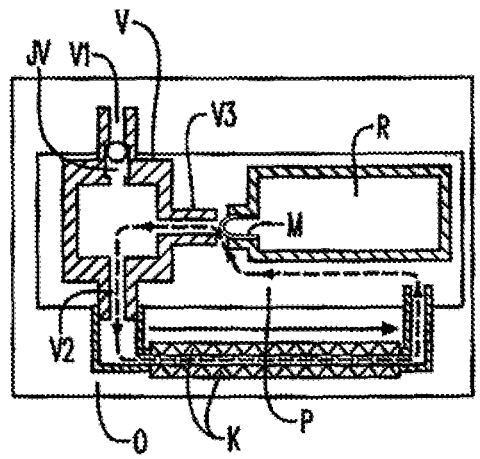
FIG. 1a shows in a schematic view an exemplary design in the position when the tire pressure is at the set—desired value.

FIG. 1a shows the three-way valve V located in the tire internal space P. Its one input V1 is connected to the external environment O and is fitted with a one-way valve JV closed with a ball. Its second input V2 opens into the chamber K with shape memory; at the same time, the chamber K opens into the tire internal space P by its other end. The last input V3 of the three-way valve V opens into the tire internal space P, on FIG. 1a. Further, the membrane M of the closure element R with reference pressure is placed against the last input V3, on FIG. 1a. The membrane M is away from the last input V3; therefore this last input V3 is open. The closure element R with reference pressure is located inside the space P of the tire. In this case, the reference pressure inside the closure element R is equal to the desired pressure of the tire. The pressure of the tire internal space P is also at the set value; thus the volume of gas contained in the closure element R is being compressed and thus the membrane M- is drawn further into the closure element R. The tire rolling along the road surface is pressing the chamber K gradually and moving the air contained in it m the direction from the three-way valve V into the tire internal space P. At the same time, the air exhausted from the three-way valve V through the chamber K is refilled through the last input V3 from the tire internal space P. In every rotation of the tire the air circulates around in the direction of the dotted arrow. Pressure in the three-way valve V is always higher than the pressure of the external environment O and it holds the ball of the one-way valve JV of one input V1 of the three-way valve V in the position closing this one-way valve JV. In the embodiment illustrated in FIG. 1A (and in the embodiments illustrated in FIGS. 1B-2D, 9A, 9B, and 10), fluid flows from the fluid source to the tire internal space P without passing through the last input or third port V3.

Figure 1B:
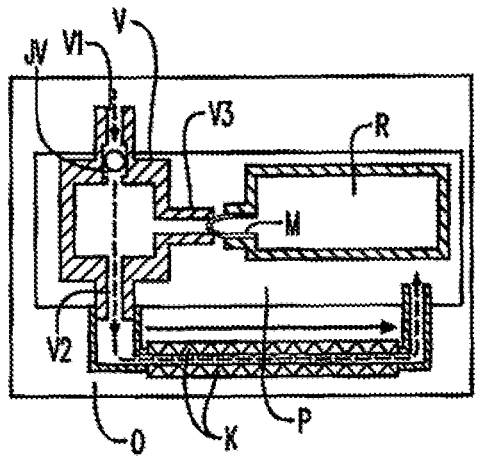
FIG. 1b shows this solution when pressure drops down.

FIG. 1b shows a tire where pressure of its chamber P dropped below the set value. The gas contained in the reference space of the closure element R is gaining in volume and expanding through the membrane M. The membrane M is thus coming closer to the last input V3 until it closes. The air is still being drawn from the three-way valve V as in the previous FIG. However, the air is no longer replaced from the tire internal space P through the last input V3 and its pressure in the three-way valve V is decreasing. When the pressure comes down below the value of the pressure of the external environment O the one-way valve JV will open and the air from the external environment O will be drawn in and carried into the tire internal space P in the direction of the dotted arrow. The membrane M is now being drawn to the last input V3 also by the under-pressure of the three-way valve V. When a sufficient amount of air has been refilled into the tire internal space P the pressure will increase to the set level, the membrane M will open the last input V3 and the pressure inside the three-way valve V will increase above the pressure of the external environment O, which will cause closing of the one-way valve JV and the situation will get back into the state shown in FIG. 1a Just before reaching the desired pressure, the membrane M may be in a condition when it has already started retracting, however, the under-pressure arising in the three-way valve V will pull up the membrane M even more, thus closing the last input V3. This is all right as more air from the external environment O will be drawn in and that will lead to another retraction of the membrane M from the last input V3. So the membrane M behaves as a self-repairing device—its instability—results in another refilling of air and thus increasing its stability in the retracted state. Also eventual accidental refilling due to e.g. a jog of the tire in drive and subsequent one-time vibration of the membrane M, which then closes the last input V3 will refill the tire just a little towards stabilization and further similar situations will be avoided. The one-way valve JV can also be fitted with a spring that will hold it and stabilize it in a closed position. Under-pressure inside the valve V must then overcome the resistance of this spring, which is achieved by a possible high compression ratio of the device according to our solution. Single refilling will draw in a relatively small amount of air within the range of tenths through ones to tens of cubic centimeters (ccm). In the given example, the tire has the inner volume of 33,000 ccm and the compressed air contained in it takes up approx. 100,000 ccm at the atmospheric pressure. Every refilling of 1 ccm will then inflate the tire by approx. 1/100,000, i.e. by 0.001%. This could appear as a little, however, the passenger car tire makes approx. 500 revolutions per kilometer and refilling of 1 ccm/rev. will inflate the tire by 1% in 2 km, which is relatively quick inflation.

Example 2

Figure 2A:
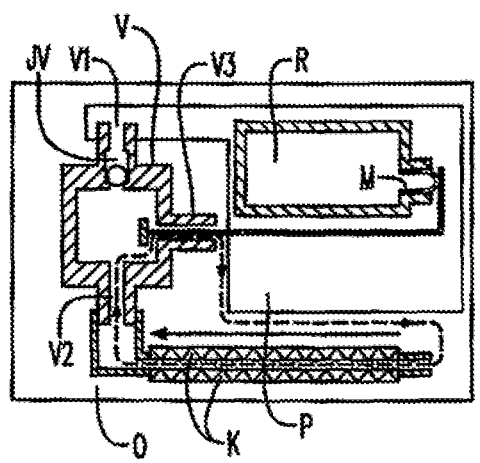
FIG. 2a shows another exemplary design in the position when the tire pressure is at the set value.

FIG. 2a shows the three-way valve V located in the tire internal space P. Its one input V1 is connected to the tire internal space P and is fitted with a one-way valve JV closed with a ball. It is another input V2 opens into the chamber with shape memory K; at the same time, this chamber K opens into the external environment O with its other end. The last input V3 of the three-way valve V opens into the external environment O, on this FIG. Further, there is a tie rod in the last input V3 in this fig., with its seal controlled by the membrane M, closing the reference space of the closing element R; the seal is far away from this last input V3, therefore it is open. The reference space is located inside the tire internal space P. In this case, the reference pressure inside the closure element R is equal to the desired pressure of the tire. Pressure of the tire internal space P is also at the set value; thus the volume of gas contained in the reference space is compressed and the membrane M is being drawn further into the reference space. The tire rolling along the road surface is pressing the chamber K gradually and moving the air contained in it in the direction from the external environment O into the three-way valve V in the direction of the dotted arrow. At the same time, the air pushed into the three-way valve V from the chamber K is being pushed out through the last input V3 into the external environment O. In every rotation of the tire, the air circulates around in the direction of the dotted arrow. Pressure in the three-way valve V is always lower than pressure in the tire internal space P and it holds the ball of the oneway valve JV of one input V1 of the three-way valve V in the position closing this one-way valve JV.

Figure 2B:
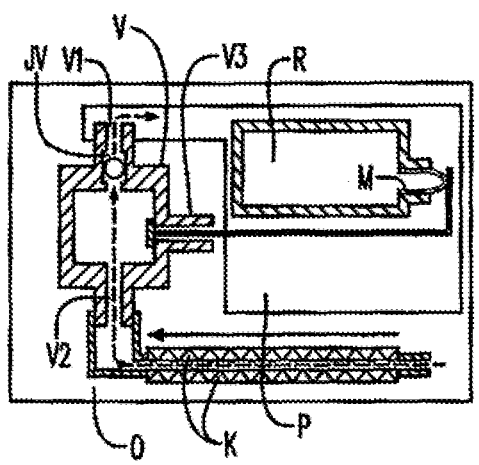
FIG. 2b shows this solution when pressure drops down.

FIG. 2b shows a tire where pressure of its chamber P dropped below the set value. The gas closed in the reference space is gaining on volume and expanding through the membrane M. The membrane M is thus moving the tie rod with the seal, which is thus coming closer to the last input V3 until it closes. The air is further being pushed into the three-way valve V as in the previous FIG. However, the air is no longer passing into the external environment O through the last input V3 and its pressure in the three-way valve V is increasing. When it rises over the current value of the pressure of the tire internal space P and when it overcomes the forces closing the one-way valve JV this valve will open and the air will be pushed from the external environment O into the three-way valve V and carried further into the tire internal space P in the direction of the dotted arrow. The seal is now pressed against the last input V3 also by the over-pressure inside the three-way valve V. When a sufficient amount of air has been refilled into the tire internal space P the pressure will increase to the set level, the membrane M will retract and push away the seal from the last input V3 and pressure inside the three-way valve V will decrease below the pressure of the tire internal space P, which will cause closing the one-way valve JV and the situation will return to the state shown in FIG. 2a.

Figure 2C:
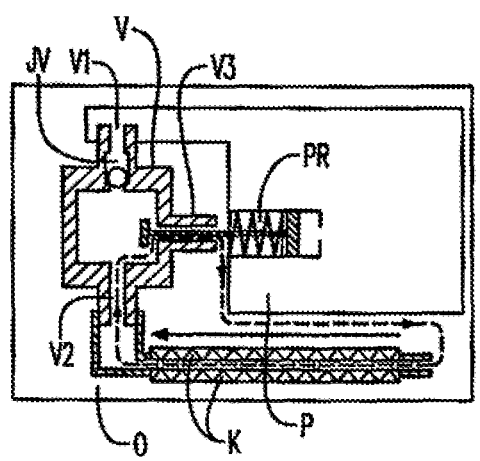
FIGS. 2c and 2d show the solution from the FIGS. 2a and 2b, where a different type of the closure element has been used.
Figure 2D:
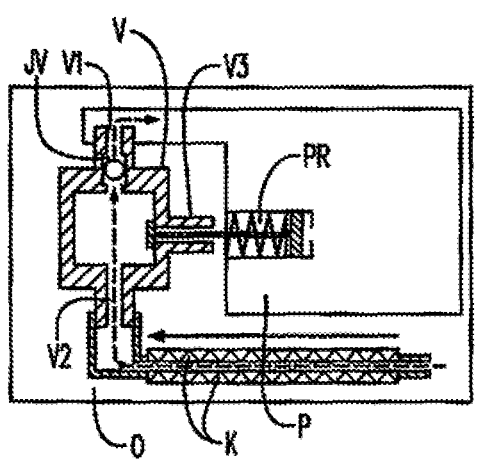

FIGS. 2c and 2d show a similar mechanism as on FIGS. 2a and 2b; however the membrane M is replaced by the spring PR. This spring PR is located so that it is affected by the pressure of the external environment; only its one side is affected by the pressure of the tire internal space P. When the tire pressure drops down the spring PR will stretch and close the last input V3. When the pressure rises up to the desired pressure the spring PR will squeeze and open the last input V3.

The internal space of the three-way valve V should be as small as possible in order to increase the compression ratio and the tire refill rate. When the car is reversing, which causes pressing the air from the chamber K into the three-way valve V, a high compression ratio could damage the valve V or chamber K. However, if the membrane M is used, then the air overpressure will push it away and the air can then leak out back into the tire internal space P without damaging any parts. Also, the one-way valve JV can be used for standard inflation by an external air compressor, e.g. at the gas station, as the inflating air from the three-way valve V will get further into the tire through the last input V3, even in case of its closure by the membrane M because the inflation pressure will push the membrane M away from the last input V3 during inflation.

A disadvantage of some previous patent applications was that the chamber K was recommended only for a part of the tire perimeter. The reason was that the output pressure of the device was controlled by the compression ratio of the deformable and non-deformable parts of the chamber K while it was important that the pressure inside the chamber K equalizes with the pressure of the external environment O or with the pressure of the tire internal space P, in every rotation. If the chamber K was as long that both its input and output were closed in one moment, such equalization of pressures could not occur. However, when the three-way valve V is used according to this patent application it does not need similar equalization of pressures for its proper functioning and thus the whole tire perimeter can be used to create the chamber K.

Example 3

Figure 3A:
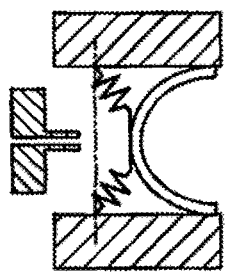
FIG. 3a through 3d shows in a schematic view different designs of the closure element and the closure member formed by the membrane.

The rate of inflating depends on the ratio of the volume of chamber K to other parts, into which it presses the air, or parts, from which it draws the air out. Both the inner volume of the three-way valve V and the volume of the connection between the three-way valve V and the chamber K should be as small as possible. If it is not efficient or possible to make a short interconnection you can increase the rate of inflating by mounting an additional one-way valve DV between the three-way valve V and chamber K, see FIGS. 9a and 9b. This auxiliary one-way valve DV opens in the direction of the function of the chamber K and allows air circulation in the same way as shown in FIG. 1a, or 3a, respectively. In this case, however, after closing the last input V3 in every cycle the cyclic opening of the chamber K will be no longer able to ensure equalization of the pressure between the inside of the three-way valve V through the chamber K and the external environment O or the tire internal space P and there will be higher overpressure or under-pressure inside the valve than without the auxiliary one-way valve DV.

Example 4

The examples describe a three-way valve V, which in the moment of proper inflation of the tire allows circulation only between the chamber K and the tire, or chamber K and external environment O, while the three-way valve V ensures this communication by the last shut-off input V3 and also through the input V2 into one end of the chamber K. However, the last input V3 can also be placed deeper inside the chamber K and this can also decrease the inner dead volume of the three-way valve V, which will result in higher compression ratio during inflating. Then the chamber K will be connected by its one end to the one-way valve JV while the last input V3 will be created further in the body of the chamber K, see FIG. 10, and the closure element can comprise a member M with a shape matching an opening in a wall of the chamber. However, the deformable volume of the part of the chamber K between the oneway valve JV and the last input V3 should not be too large. Because if this volume was too large an unwanted inflation could occur even in case of the proper inflation of the tire and despite an open state of the last input V3.

For the three-way valve V described in this application you can use a chamber K with the same length or even longer than an undeformed perimeter of the tire at the chamber location. It means that the input and output of the chamber K can be located close to each other or the chamber K can overlap its part on the other end. If the input and output of the chamber K are close enough to each other so that they can be both closed by the deformed part of the tire at one point during the revolution, or the chamber K overlaps itself and at the same time if the input V3 is closed then pressure or under pressure accumulates inside the chamber K during rolling the tire. In such a case, e.g. when using the one-way valve JV interconnected with the external environment O, the chamber K begins to draw the air out of it while deformation runs lengthwise with the chamber K. In a certain moment deformation closes a complete circuit towards the beginning of the chamber K and will go on. After the deformation has passed through the end of the chamber K leading to the tire, the chamber K will be filled through this end with the air from the tire and the pressure in the chamber K will equalize with the tire pressure. Before that moment, however, the chamber K has also been deformed and cross-wise broken on its end next to the three-way valve V and this break will not let the air from the tire into the chamber K as far as to the three-way valve V. So in this case, there is continuous under-pressure in the three-way valve V, which allows continuous refilling through the one-way valve JV instead of constant opening and closing of this one-way valve JV in every rotation. That will simplify the function of the one-way valve JV and increase the compression ratio of the device. Thus, the dead volume of the chamber K and three-way valve V is basically fully eliminated and all volume of the chamber K is filled with the air from the external environment in every cycle and this air is inflated into the tire.

Example 5

Figure 11A:
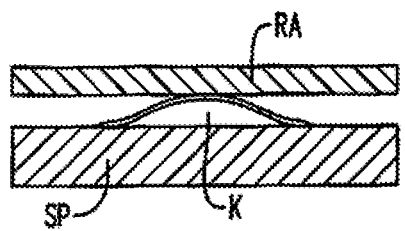
FIG. 11a through 11f shows the chamber in a section plan, created between the tire wall and rim.
Figure 11B:
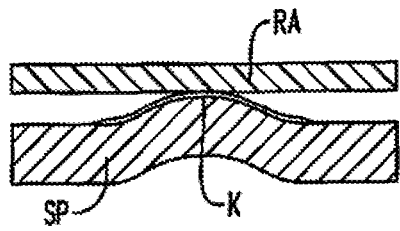
Figure 11C:
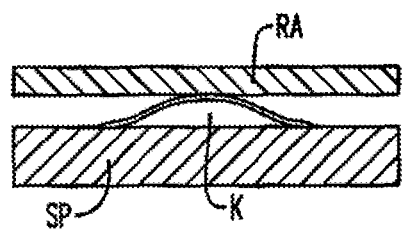
Figure 11D:
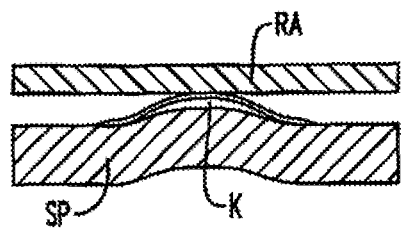
Figure 11E:
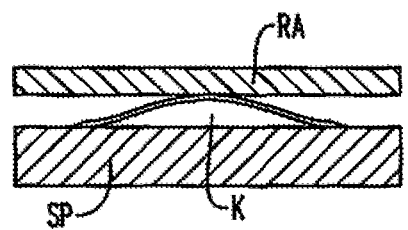
Figure 11F:
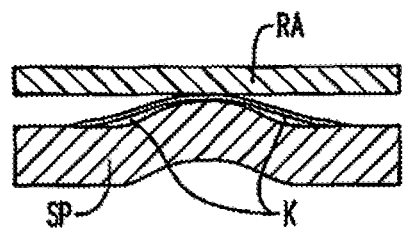

FIG. 11a shows the chamber K created between the tire wall SP and rim RA in length matching the lengthwise circumferential length of tire deformation at the rim RA. The inner volume of this chamber K matches to the volume, in which the tire shifts towards the rim RA when loaded, thus filling the whole chamber K with a mass of deforming tire wall SP once in a rotation. This mass is compressing the air inside the chamber K. The chamber K is connected to the external environment O via one valve and with the tire chamber via the other valve. The valves are not shown in the FIG. For such arrangement it is necessary that at least one valve is controlled or that the chamber K has a built-in compression ratio, and thus also the desired output pressure on its output into the tire. The chamber K created in this way has an advantage of getting fully closed in every cycle, see FIG. 11b, and reaching a sufficiently high compression ratio. The chamber K will reach a sufficient compression ratio even in the case that it has been created in such a way that zero cross-section of the chamber K is not ensured, which is needed in other peristaltic chambers K located in or at the tire wall SP. Such a chamber K is shown in FIGS. 11c and 11d. That will happen under the condition that the volume of the chamber K before and during load multiplied by the ambient pressure is the same or higher than the desired output pressure. For this reason, the chamber K may even be a bit longer than the circumferential length of tire deformation at the rim RA, see FIGS. 11e and 11f, but it can also be shorter than this.

Example 6

Figure 12A:
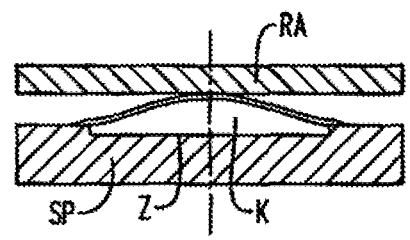
FIG. 12a through 12c shows the chamber in a side view with a precisely defined volume when loaded and when not.
Figure 12B:
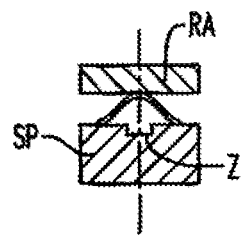
Figure 12C:
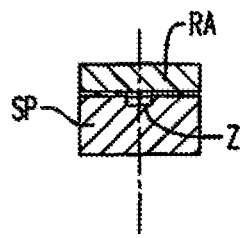

FIG. 12a shows the chamber K with a precisely defined volume when loaded and when out of load. A chute Z interconnecting all parts of the chamber K is created in the bottom of the chamber K; volume of this chute 21 is a minimum volume of the chamber K at the same time, so defining the compression ratio and output pressure of the chamber K. Cross-section through this chamber K marked by a broken line in FIG. 12a is shown in FIG. 12b before loading and in FIG. 12c during loading, or during tire deformation. Interconnection of all parts of the chamber K by the chute Z ensures that during shifting of deformation along the chamber K, there will be not too big increase in pressure at the end of the chamber K, towards which the deformation is advancing at rolling of the tire. Air from this place is thus escaping via the chute Z into other parts of the chamber K.

Example 7

Figure 13A:
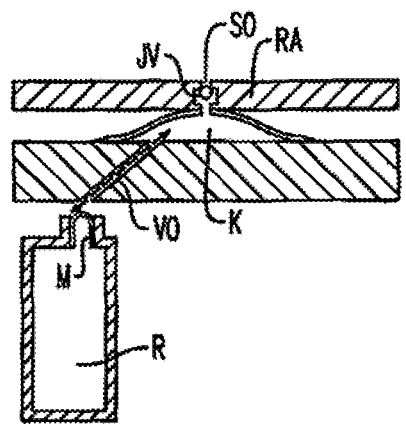
FIG. 13a through 13f show the chamber fitted with a one-way valve at the suction hole or opening interconnected with the external environment and at the output into the tire it is fitted with an opening closed by the membrane of the reference space.
Figure 13B:
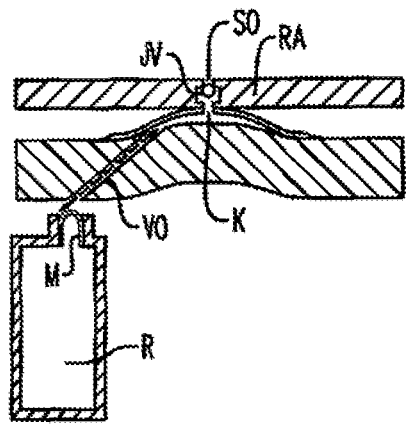
Figure 13C:
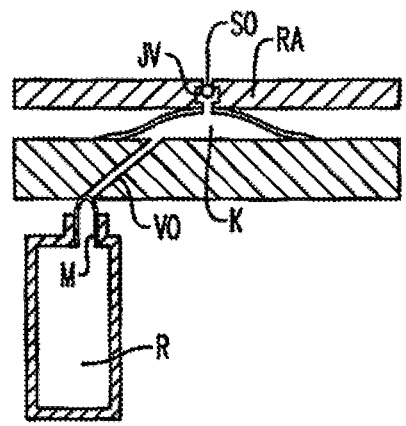
Figure 13D:
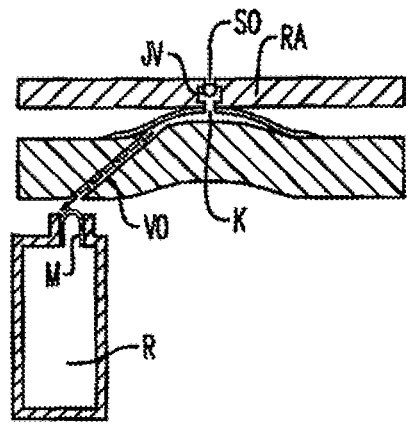
Figure 13E:
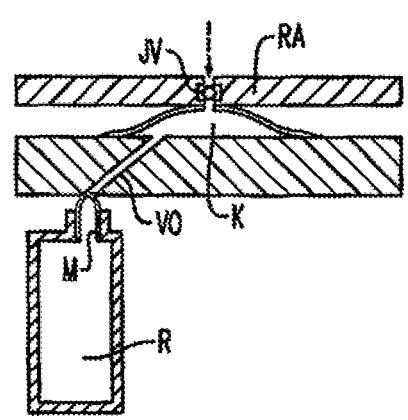
Figure 13F:
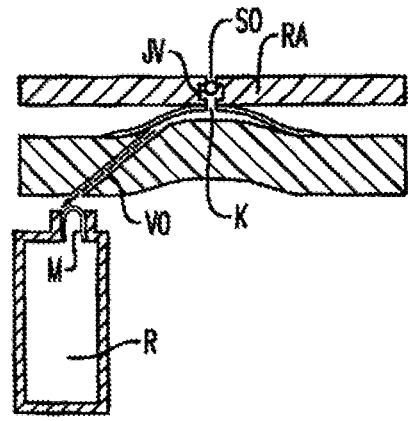

FIG. 13a shows the chamber K in an unloaded state, fitted with a one-way valve JV at the suction hole SO interconnected with the external environment O and fitted with an opening closed by the membrane M of the reference space at the output VO connecting it to the tire. FIG. 13b shows the same chamber K under load. In a properly inflated tire the air enclosed in the reference space R is compressed and it keeps the membrane M retracted from the output VO of the chamber K leading into the tire, see FIGS. 13a and 13b. In every cycle the air will be pushed out of the chamber K into the tire and subsequently drawn from the tire back into the chamber K; the air is thus moving only in the direction of the bi-directional broken arrow. If the tire pressure drops down the membrane M is drawn out towards the output VO of the chamber K leading into the tire until it closes the output VO, see FIG. 13c. When the chamber K is pressed down, see FIG. 13d, the air from the chamber K will push away the membrane M and it will pass through into the tire chamber P in the direction of broken arrow; however, after the expansion of the chamber K shown in FIG. 13e the chamber K cannot draw back the air from the tire anymore and under-pressure arises within the chamber K. The chamber K is then drawing in air from the external environment O, see broken arrow in FIG. 13e, and then it will push out the air into the tire around the membrane M, see FIG. 13f. Then the cycle repeats itself, see FIGS. 13c, 13d, 13e, and 13f, until the desired tire pressure is reached. When the pressure gets to the value set by the pressure of the reference space R the membrane M will retract from the output VO, see FIGS. 13a and 13b, the air will be again moving only between the tire inner space P and chamber K, thus avoiding the decrease of the pressure in the chamber K below the value of the pressure of the external environment O and inflating stops. The membrane M can be replaced or fitted with a spring; alternatively the output VO can be closed electronically. The pressure of the reference space R does not need to be the same as the desired tire pressure; it only has to ensure closure of the output VO in an under-inflated tire.

Example 8

Figure 14A:
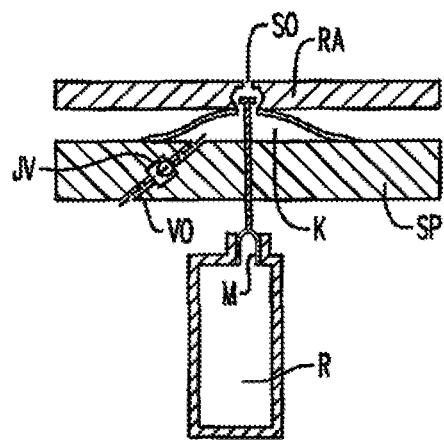
FIG. 14a through 14f show a similar device as in FIG. 13, however, the membrane controls the chamber suction hole through a tie rod connecting the chamber with the external environment and the output into the tire is fitted with a one-way valve.
Figure 14B:
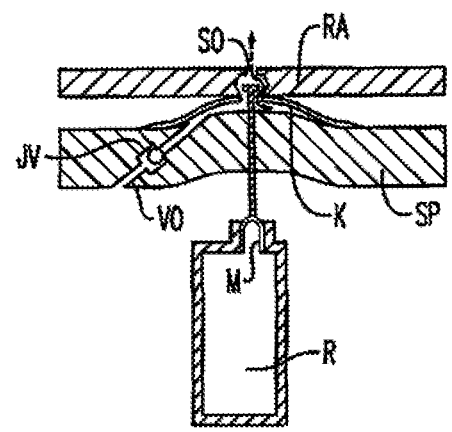
Figure 14C:
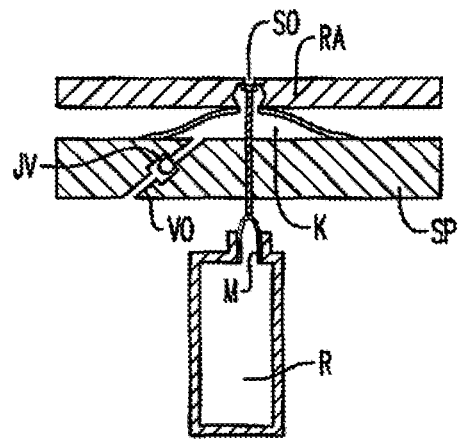
Figure 14D:
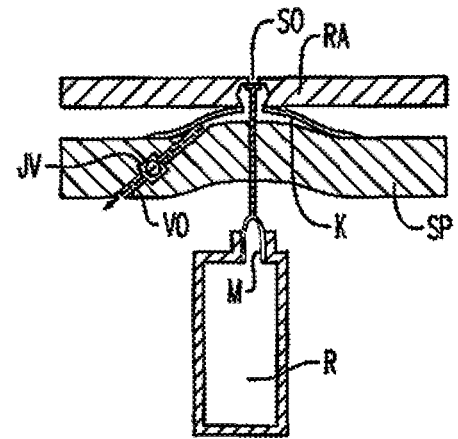
Figure 14E:
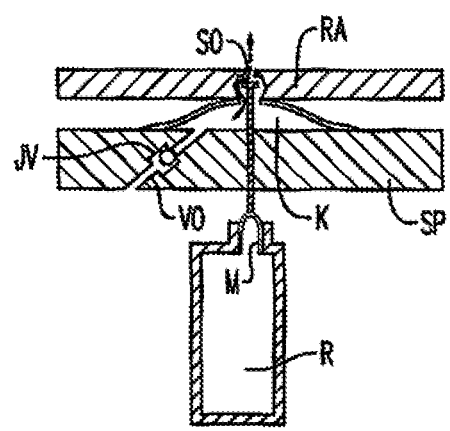
Figure 14F:
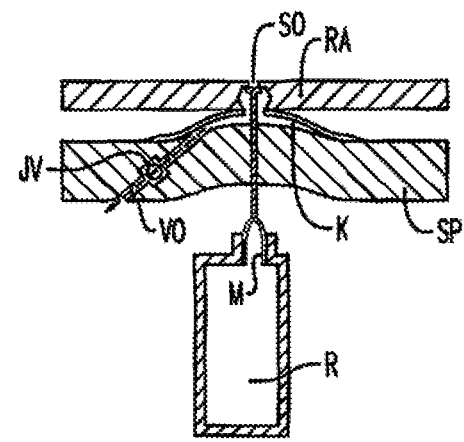

FIG. 14a shows a device similar to the previous example; however, the membrane M controls the suction hole SO of the chamber K through a tie rod, connecting the chamber K with the external environment O and the output VO leading into the tire is fitted with a one-way valve JV. FIGS. 14a and 14b show the device in a state of a properly inflated tire, with the tie rod retracted from the suction hole SO and the air moving around it only between the chamber K and the external environment O, as marked by the bi-directional broken arrow in FIG. 14b. So the chamber K contains air from the external environment O, with a pressure of approximately IA, and it is separated from the tire chamber P by the one-way valve JV. The one-way valve JV is closed by higher pressure from the tire side. FIG. 14b shows decrease of the tire pressure with the membrane M having pressed the tie rod against the suction hole SO. Pressing down the chamber K, see FIG. 14d, makes the pressure in the chamber K increase above the tire pressure, which presses the air into the tire internal space P through the one-way valve JV. When the chamber K is relieved the one-way valve JV closes again and the chamber K draws in the air from the external environment O around the tie rod in the direction of the one-directional broken arrow, see FIG. 14e, while the drawn air will push away the tie rod from the suction hole SO for a moment. In this way the tire is inflated. When the chamber K is pressing down the air contained in it is being moved into the tire again. When the tire has been inflated to the desired value the membrane M will retract towards the reference space R, taking the tie rod along and relieving the suction hole SO, see FIGS. 14a and 14b.

The device shown in FIGS. 13 and 14 allows reaching high compression ratio of the inflating device during inflation in the way that out of inflation phases, it lets the air circulate freely between the chamber K and the external environment O or the chamber K and the tire chamber P. Only during inflation, it disables this circulation and the rate of inflating can thus be given just by the compression ratio of currently working parts. If the membrane M is set so that it is fully sealing the output VO or suction hole SO and circulating air cannot push it away from the output VO or suction hole SO even if it is necessary, an additional valve can be installed next to the membrane, which will let the air to pass from the chamber K into the tire or from the external environment O into the chamber K. Theoretically, up to 100% of the volume of the chamber K can then be used for inflation and all that without so-called dead volumes. The inner volume of the associated parts, e.g. tire valve, can be the part of the non-deformable volume as well.

That is effective in the design when the tire has a standardized chamber K and using valves with different inner volumes creates an arrangement with a different compression ratio required for different applications of the tire. Then if the described circulation during the non-inflation period would not be enabled there would be constant cyclic increase of pressure or under-pressure in the chamber K, and so also constant stressing leading to potential destruction.

The membrane M can be replaced and the closure element R can consist of a closure member connected to another wall of the chamber K and/or another part of the tire or rim RA, while this member is at least partially located opposite to the suction hole SO and this hole will be covered and/or filled by the member upon the shift of the wall of the chamber K with the suction hole SO, thus preventing the air leak out of the chamber K to the external environment. During ongoing compression of the chamber K, the air contained in it starts to compress and subsequently pass through the valve via output VO into the tire, thus inflating it. Moving this closure element R towards the suction hole SO will increase the built-in compression ratio, while moving it away from the suction hole SO will decrease the compression ratio and inflating pressure.

A shifting element can be at least partially inserted in the chamber K, which can change its inner volume by its moving m or out the chamber K and thus also the compression ratio and desired output pressure.

Example 9

Figure 3B:
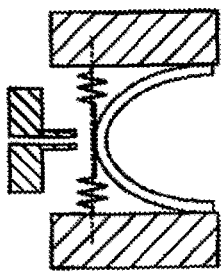
Figure 3C:
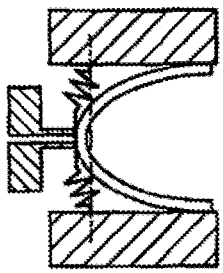
Figure 3D:
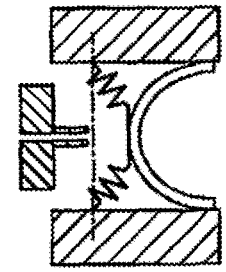

FIG. 3a to 3d show in a schematic view the membrane M fitted with the spring PE. This spring PE allows only instant closing of the last input V3 or suction hole SO or output VO by the membrane M instead of continuous closing. Thus the membrane M is pushing against the spring PE and has to overcome its resistance in order to pull up to the last input V3 or to the suction hole SO or output VO. When it overcomes this resistance the membrane M will pull up to the last input V3 or to the suction hole SO or output VO immediately. The membrane M must then overcome the resistance of the spring PE again in order to fully open the last input V3 or the suction hole SO or output VO. The spot of overcoming the resistance of the spring PE is marked by a vertical dotted line in the figures. FIG. 3a shows how the membrane M starts to inflate and push towards the last input V3 or the suction hole SO or output V£. Doing so it not only overcomes the pressure of the external environment O but also the force of the spring PE pushing against it. FIG. 3b shows the spring PE almost in the position when it changes the direction of its force; this position is marked by a vertical dotted line. The spring PE continues to push against the membrane M. FIG. 3c shows the spring PE when it has already overcome the equilibrium state. The spring has quickly withdrawn from the equilibrium state marked by a vertical dotted line and its force is now acting in the direction of the membrane M, thus helping to push it against the last input V3 or against the suction hole SO or output VO to close it. Then the inflation of the tire makes the membrane M blow off and it is trying to retract from the last input V3 or from the suction hole SO or output VO but the spring PE resists it. When the membrane M overcomes the resistance of the spring PE it will retract from the last input V3 or suction hole SO or output VO into the position marked on the FIG. 3d. This FIG. shows the spring PE which helps both to open and close the last input V3 or the suction hole SO or output VO instantly. However, you can also use the spring PE which allows incremental closing and then gradual opening, or gradual closing and then incremental opening. A similar spring PE can also be used when the membrane M is replaced by spring PR or also when the membrane M is fitted with a spring PR.

The tire pressure is typically specified in a cold state because the tire warms up during operation and the pressure increases depending on the raised temperature. It would be too complicated for the user to search for a proper inflation pressure for a temperature that would be different for each inflation due to different tire temperatures. However, in the present case, proper inflation can be achieved at any temperature due to reference space containing air. Reference space placed inside the tire internal space P and the tire internal space P will have approximately the same temperature, which means the pressure of the reference space will be increasing concurrently with the increasing pressure of the tire. Thus the membrane M can protrude only when the tire pressure actually drops down below the desired pressure of the tire, regardless of warming or cooling of the tire.

Reference space with the membrane M can be fitted or replaced with a spring, which will close the last input V3 or the suction hole SO or output VO only when the tire is under-inflated; if it is e.g. bimetallic it can also assist in proper inflation even at varying operating temperatures; however, it would be technically more demanding in this case. On the other hand, the spring can be smaller than the reference space and also easier to calibrate. Alternatively, the last input V3 or the suction hole SO or output VO can be opened and closed by an electronically controlled valve—for example by an electronic control unit or even by piezo-electric means, where change in the tire pressure acts upon the piezo-electric unit—instead of the reference space and the membrane M.

Example 10

Figure 4A:
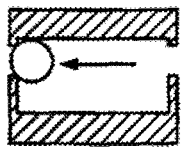
FIG. 4a through 4e show in schematic view different designs of the closure member in the one-way valve.
Figure 4B:
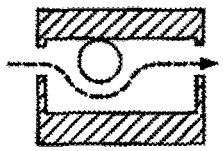
Figure 4C:
Figure 4D:
Figure 4E:
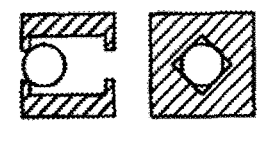
Figure 4E:
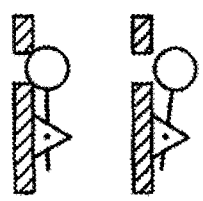

Strong varying centrifugal forces act in the tire, which have an influence to proper functioning of movable parts. For example, if the ball of the one-way valve JV has the freedom of movement across the wheel axis and closes the one-way valve JV in the position further from the axis, the one-way valve JV may not open because the ball will be still held in closed position by the centrifugal force that will be higher than the drawing force of the chamber K drawing from the other side of the ball. As the centrifugal force is varying depending on the velocity it is difficult to eliminate. One of the methods is to mount the movable parts in such a way that they have freedom of movement only in the direction parallel with the wheel axis and/or they have no freedom of movement in the direction in which the centrifugal force acts. When the ball of the one-way valve JV is put in a guidance tunnel parallel with the tire axis it will move in the direction "closed/open" mainly by the force of air pressure difference acting on its opposite ends. This can be seen in FIG. 4a, where the ball is closing the input, and FIG. 4b, where the ball has opened the input. The ball is moving only in parallel with the wheel axis, thus eliminating the centrifugal forces. FIGS. 4c and 4d show other examples of guiding the ball, always pictured first in the coaxial section and then in cross-section with respect to the wheel axis. Also FIG. 4e shows the ball guidance mostly parallel to the wheel axis,—an opened and closed valve is shown.

Figure 5A:
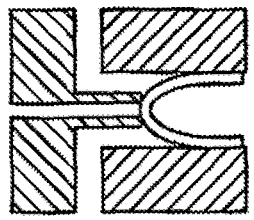
FIG. 5a through 5d show different designs of the closure element's membrane.
Figure 5B:
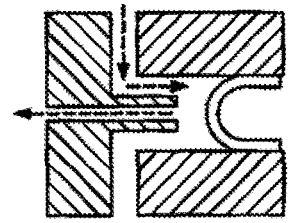
Figure 5C:
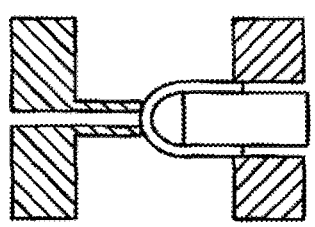
Figure 5D:
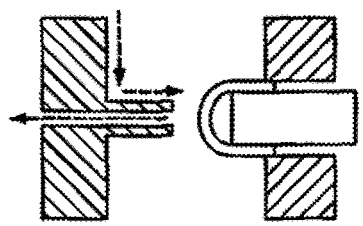
Figure 6A:
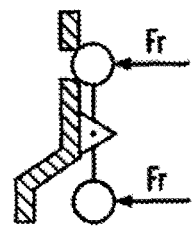
FIG. 6a through 6d show different designs of the closure member.
Figure 6B:
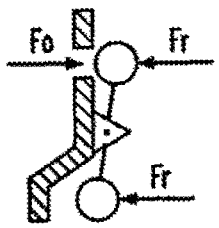
Figure 6C:
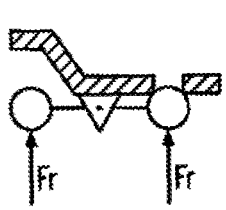
Figure 6D:
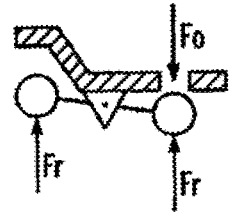

Similarly, the membrane M or the spring can be guided in parallel with the rotation axis, or it can be placed in a guiding tunnel that will prevent it from significant diversions from the required direction. This is shown in FIG. 5a, where the membrane M is in the position closing the last input V3 or the output VO, and in FIG. 5b, where the membrane M is in the position opening the last input V3 or the output VO. The membrane M or spring can be strengthened with a guiding-rod as is shown in FIGS. 5c and 5d, or it can be replaced by a piston. You can also replace or extend this method by making a counterweight to the movable part. If the centrifugal force, or e.g. vibration, acts on the movable part and its counterweight at the same time, these centrifugal forces or vibrations will equalize and eliminate for such connected parts, see FIG. 6a through 6d. FIG. 6a shows the closure member counterbalanced by the counterweight in the position closing the input. The disturbing force Fr, caused by e.g. the centrifugal force when driving through a curve, or by vibration due to undulation, will act on both sides of the balance arm and equalize. Thus the effect of the disturbing force Fr is eliminated and the figured opening force Fo can open the closure element undisturbed, see FIG. 6b. This design of the closure element will best eliminate disturbing forces acting across the balance arm. In principle, however, it will eliminate any disturbing forces acting in any direction because their component, parallel with the wheel axis, will be eliminated by the leverage of balance arms and the component perpendicular to the axis will be eliminated by the fact that the lever and closure member do not have freedom of movement in the direction perpendicular to the wheel axis,—alternatively it can be eliminated by the interaction of the counterweights. The balance arm should be designed perpendicular to potential disturbing forces so that these forces were, if possible, always equal, even with respect to e.g. torque etc. FIGS. 6*c* and 6*d* show the balance arm coaxial to the rotation axis.

Example 11

Air is drawn out of the three-way valve V through the chamber K. For a properly inflated tire, this air is replaced by the air from the tire internal space P. In order to keep the air replacement continuous even for higher rates of exhaustion that reach the limits of the throughput of the next input V2, it is appropriate that, for a properly inflated tire, the last input V3 has the same or higher throughput than next input V2. Otherwise, the three-way valve V would not be able to compensate the air leak from the last input V3 and even for a properly inflated tire; it would refill air through the one-way valve JV.

This is valid for any opening connected to the chamber in order to avoid such bottleneck.

The one-way valve JV can also be used for standard inflation by en external air compressor, e.g. at gas station, as the inflation air will get further into the tire through the input with the membrane M, even in case of its closure by this membrane M because the inflation pressure will be pushing away the membrane M during inflation.

The solutions described in the examples omit qualities such as natural elasticity of the membrane M, which will have to be counted towards its behavior, or it will be negligible from the view of the device function, depending on the design of the device. Also the pressure of the reference space need not always be the same as the desired pressure of the tire; it can be also higher or lower. It has just to make sure that when the pressure drops down the membrane M will be pushed as far as to the specific interconnection and after the air has been refilled to the proper tire pressure it will retract from the specific interconnection.

Example 12

Effectively, the reference space R with the membrane M, or a spring, can be shift-able in the direction from/to the last input V3 or the output VO by means of a suitable mechanism ME (FIGS. 7E-7K). The mechanism may, for example, set a distance of a closure element such as the membrane M or the additional closure element JM (FIGS. 8*a*-8*b*) at least one of from the third port V3 of the arrangement, from an opening of the chamber (see FIG. 10), and from a discharge hole (see FIGS. 8*a*-8*b*). The desired tire pressure can be altered by their shifting during assembly or even during operation. Shifting closer to the last input V3 or output VO will cause an increase of the desired pressure as in this case the last input V3 or output VO will be closed sooner with the membrane M—in lower decrease of the tire pressure—and the membrane M will then retract from the last input V3 or output VO only in a higher increase of the tire pressure than before the shifting closer to the last input V3 or output VO. Accordingly, the shifting out of the last input V3 or output VO will cause a decrease of the desired tire pressure. Similarly, the pressure can be set to close the suction hole SO, when the membrane M is used.

Figure 7A:
Figure 7B:

The reference space R can be compressible and/or expandable by means of a suitable mechanism ME (FIGS. 7E-7K). Its compression will cause a change in calibration and setting a higher desired pressure; its expansion will in turn cause a decrease of the set desired pressure. The movable or compressible/expandable reference space R is advantageous from the point of manufacture, where the same closure element can be used for different desired tire pressures due to easy modification at the assembly, as well as at the operation, where the vehicle operator can change the desired pressure, see FIG. 7*a* through 7*j*. FIG. 7*a* shows the reference space R and the membrane M in a moment when the tire pressure is lower than desired and the membrane M close the last input V3 or the output VO. FIG. 7*b* shows an identical reference space R and the membrane M while even the pressure in the reference space and tire are same as in FIG. 7*a*. However, a suitable mechanism can cause the reference space R with the membrane M further away from the last input V3 or the output VO, which remains open. By mere rolling out the reference space R, the set desired tire pressure has decreased and the tire is not being refilled. Accordingly, the pressure can again be set to close the suction hole SO, when the membrane M is used.

Figure 7C:
Figure 7D:
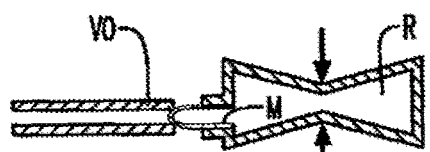

FIGS. 7*c* and 7*d* show the change in the volume of the reference space R by the application, such as by a suitable mechanism ME, of a continuous force on its walls in the direction of the points, which results in pressing the membrane M against the last input V3 or the output VO and increasing the desired pressure. The arrangement shown in FIG. 7*d* will thus ensure refilling to a higher pressure value than the arrangement shown in FIG. 7*c*. Accordingly, the pressure can again be set to close the suction hole SO, when the membrane M is used.

Figure 7E:
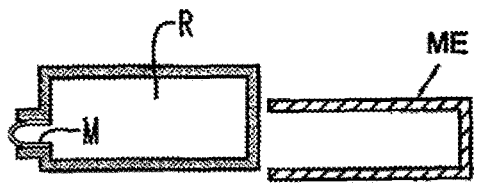
Figure 7F:
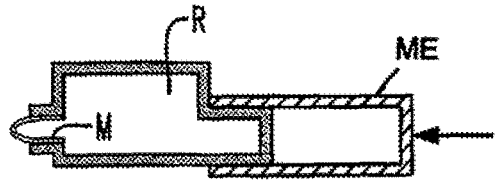
Figure 7G:
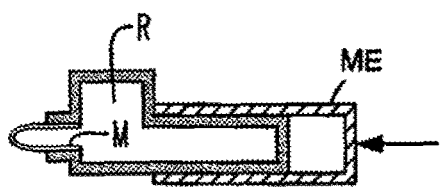
Figure 7H:
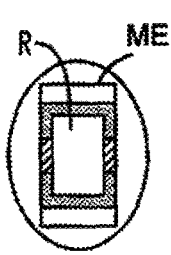
Figures 7J, 7K:
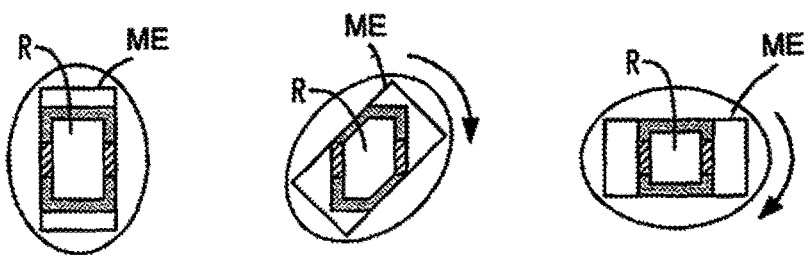

If the pressure of the reference space R is higher than the pressure of its external environment, then for example when it is made of rubberized fabric, it will stay inflated to its maximum volume defined by maximum dimensions of the rubberized fabric. FIGS. 7*e*, 7*f*, and 7*g* show the contraction of the reference space R by its gradual pressing into mechanism ME such as a smaller box in the direction of the arrow, which results in pushing out the membrane M. FIGS. 7*h*, 7*i*, and 7*j* show that the contraction/expansion of the inner volume of the reference space R is caused by turning of the outer box in the direction of the arrow. The reference space R is shown in cross-section and the membrane M is not visible in this view. Dark gray walls of the reference space R are made of fabric and black ones are solid; the revolving box is light gray. Consequently, any value from the scale can be chosen for the set desired pressure.

The above-described mechanism ME does not increase the risk compared to ordinary tires even in the case of the failure. If a damage to the reference space R or membrane M occurs it will make the inflation impossible and the tire will further behave just as a regular tire today.

Example 13

Figure 8A:
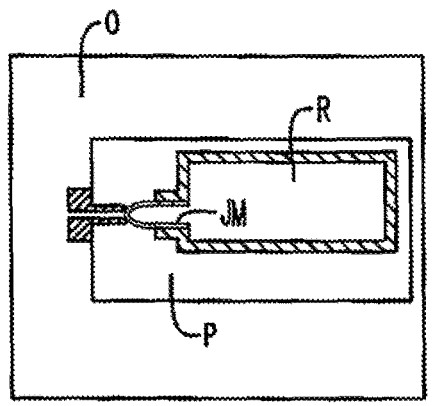
FIGS. 8a and 8b show the closure element fitted with an additional closure element.
Figure 8B:
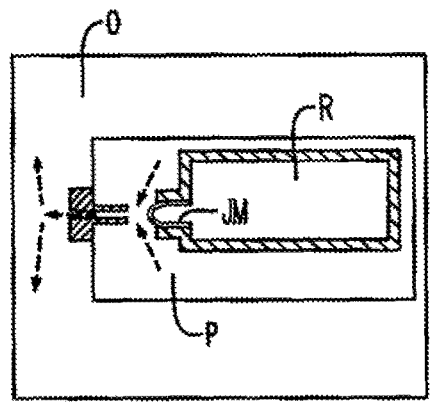

FIG. 8 shows a mechanism of relieving through an additional closure element JM. This additional closure element JM is a part of the reference space. When the tire is properly inflated, or under-inflated, the additional closure element JM closes the discharge hole leading out of the tire, see FIG. 8*a*. When the tire is over-inflated the reference space will contract and it will cause retraction of the additional closure element JM, see FIG. 8*b*, and air leakage from the tire internal space P into the external environment O, marked by broken arrows. During the air relief the tire pressure is decreasing and the air in the reference space is expanding, which will make the additional closure element JM press against the discharge hole closing it again and then return to the state shown on FIG. 8*a*. Effectively, this additional closure element JM can be fitted or replaced with a spring that will ensure pressing it against the discharge hole even in the case of the damage to the reference space R and equalization of pressures in the reference space R and the tire. Again, in this example, the tire will behave as an ordinary tire in case of damage to the reference space.

Advantages of this solution will be clear especially in the connection with an adjustable reference space, described in the previous section that is connected to both membranes—the membrane M and the membrane of the additional closure element JM. The pressure is maintained at the desired pressure value; when you choose a lower desired pressure the air will be relieved instantly, when you choose a higher desired pressure the air will be refilled during operation. The whole reference space R needs not be hidden inside the tire, i.e. it needs not be all encompassed by the actual tire pressure. It is only necessary that this pressure acts upon at least some parts of the reference space, which contract or expand due to changing tire pressures. The rest of the reference space can thus be outside the tire internal space, which will make it accessible for adjustment of e.g. its volume. Again, the additional closure element JM can be replaced or fitted with a spring, piston, or electronic valve.

Example 14

The previous examples describe the valve JV as a one-way valve, nevertheless, this valve can also be a both-way valve; the air is let inside the tire in the under-inflated tire and out of the tire to the external environment O in the over-inflated tire. Such a valve JV can then be fitted with a mechanic or electronic control element.

An accumulator can be inserted between the chamber K and the tire chamber P, which is filled from the chamber K and subsequently used to refill the tire when under-inflated.

The manufacture of this device is very simple; in its simplest configuration, it is only a chamber with a simple valve fitted with an empty, air-filled box with a membrane.

Yet, it can be used to change the pressure as necessary, during assembly as well as in operation. The device is very simple and so its manufacture is inexpensive. Yet, it is reliable even under very difficult conditions of a rotating tire.

The described device is placed in the tire wall or close to it. However, it can be used even for the chamber placed out of the tire walls with its advantages maintained.

Such a chamber K can, for example, be made of a hose placed along the perimeter of the wheel rim, where a cylinder is rolling along the hose during rotation, pressing the hose cross-wise, thus substituting for the function of the tire deformation. If this hose is connected to the valve according to this invention this valve will control the level of inflation too.

INDUSTRIAL UTILITY

A device for adjustment of pressure in tires according to this invention will find its application in production of new tires as well as modification of existing tires, both for passenger vehicles and utility vehicles.

Three-way valve V
Tire internal space P
One input V1 of the three-way valve V Next input V2_ of the three-way valve V
Last input V3_ of the three-way valve V
External environment O
One-way valve JV
Chamber K Membrane M of the closure element R
Closure element R
Spring PR
Spring PE
Disturbing force Fr Opening force Fo
Closure element JM
Suction hole SO
Tire wall SP
Rim RA Output VO

The invention claimed is:

1. A device for adjustment of pressure in tires, comprising
   a chamber having deformable walls at least partially defining the chamber, the walls having a shape memory, and
   an arrangement with ports interconnected with a fluid source and a tire internal space, where a first port of the ports is fitted with a valve, a second port of the ports is connected to the chamber, and a third port of the ports is interconnected with a closure element,
   wherein the closure element is arranged to close or open the third port depending upon a change in pressure, wherein the arrangement permits fluid flow from the fluid source through the chamber to the tire internal space without passing through the third port, and wherein, when the third port is open, the first port is closed.

2. A device according to the claim 1, wherein the first port of the arrangement is interconnected with the fluid source, the second port connected to the chamber is interconnected with the tire internal space through the chamber, and the third port with the closure element is interconnected with the tire internal space.

3. A device according to the claim 1, wherein the first port of the arrangement is interconnected with the tire internal space, the second port connected to the chamber is interconnected with the fluid source through the chamber, and the third port with the closure element is interconnected with the fluid source.

4. A device according to claim 1, wherein the closure element comprises at least one of an element with reference pressure, a spring, a membrane, a piston, and an electronic element for closing the third port of the arrangement or an opening of the chamber.

5. A device according to claim 1, wherein the closure element is fitted with a mechanism for setting a distance of the closure element at least one of from the third port of the arrangement, from an opening of the chamber, and from a discharge hole.

6. A device for adjustment of pressure in tires, comprising
   a chamber having deformable walls at least partially defining the chamber, the walls having a shape memory, and
   an arrangement with ports interconnected with a fluid source and a tire internal space, where a first port of the ports is fitted with a valve, a second port of the ports is connected to the chamber, and a third port of the ports is interconnected with a closure element, wherein an auxiliary one-way valve is placed between the arrangement and the chamber, and wherein the arrangement permits fluid flow from the fluid source to the tire internal space without passing through the third port.

7. A device for adjustment of pressure in tires, comprising
   a chamber having walls at least partially defining the chamber, the walls having a shape memory, and
   an arrangement with ports interconnected with a fluid source and a tire internal space, where a first port of the ports is fitted with a valve, a second port of the ports is connected to the chamber, and a third port of the ports is interconnected with a closure element,
   wherein a length of the chamber in a direction of tire rotation equals 0.001 to 0.5 multiplied by a perimeter of the tire, where a ratio of a volume of the chamber before deformation to a volume of the chamber during deformation is at least as high as a ratio of a desired tire pressure to a pressure of the fluid source, wherein the arrangement permits fluid flow from the fluid source through the chamber to the tire internal space without passing through the third port, and wherein, when the third port is open, the first port is closed.

8. A device for adjustment of pressure in tires, comprising a chamber having deformable walls at least partially defining the chamber, the walls having a shape memory, and an arrangement with ports interconnected with a fluid source and a tire internal space, where a first port of the ports is fitted with a valve, a second port of the ports is connected to the chamber, and a third port of the ports is interconnected with a closure element, wherein the closure element is arranged to close or open the third port depending upon a change in pressure, wherein the arrangement permits fluid flow from the fluid source through the chamber to the tire internal space without passing through the third port, and wherein the closure element comprises a member with a shape matching an opening in a wall of the chamber.

9. A tire or a rim fitted with a device for adjustment of pressure, comprising a chamber defined by deformable walls that have a shape memory, and an arrangement with ports interconnected with a fluid source and a tire internal space, where a first port of the ports is fitted with a valve, a second port of the ports is connected to the chamber, and a third port of the ports is interconnected with a closure element, wherein the arrangement permits fluid flow from the fluid source through the chamber to the tire internal space without passing through the third port, and wherein, when the third port is open, the first port is closed.

10. A tire or a rim according to the claim 9, wherein the first port of the arrangement fitted with the valve is interconnected with the fluid source, the second port connected to the chamber is interconnected with the tire internal space through the chamber, and the third port with the closure element is interconnected with the tire internal space.

11. A tire or a rim according to the claim 9, wherein the first port of the arrangement fitted with the valve is interconnected with the tire internal space, the second port connected to the chamber is interconnected with the fluid source through the chamber, and the third port with the closure element is interconnected with the fluid source.

12. A tire or a rim according to claim 9, wherein a closure element comprises a member with a shape matching an opening in a wall of the chamber connected to another wall of the chamber or another part of the tire or a rim.

13. A tire or a rim according to claim 9, wherein the closure element comprises at least one of an element with reference pressure, a spring, a membrane, a piston, and an electronic element for closing the port of the arrangement or port and/or output of the chamber.

14. A tire or a rim according to claim 9, wherein the closure element is fitted with a mechanism for setting a distance of the closure element at least one of: from a port of the arrangement; from an opening of the chamber; and from a discharge hole.

15. A tire or a rim fitted with a device for adjustment of pressure in tires, comprising a chamber having walls at least partially defining the chamber, the walls having a shape memory, and an arrangement with ports interconnected with a fluid source and a tire internal space, where a first port of the ports is fitted with a valve, a second port of the ports is connected to the chamber, and a third port of the ports is interconnected with a closure element, wherein a length of the chamber in a direction of tire rotation equals 0.001 to 0.5 multiplied by a perimeter of the tire, where a volume of the chamber before deformation to volume of the chamber during deformation ratio is the same or higher than a desired tire pressure to pressure of the fluid source ratio, wherein the arrangement permits fluid flow from the fluid source through the chamber to the tire internal space without passing through the third port, and wherein, when the third port is open, the first port is closed.

16. A tire or a rim fitted with a device for adjustment of pressure, comprising a chamber defined by deformable walls that have a shape memory, and an arrangement with ports interconnected with a fluid source and a tire internal space, where a first port of the ports is fitted with a valve, a second port of the ports is connected to the chamber, and a third port of the ports is interconnected with a closure element, and wherein the arrangement permits fluid flow from the fluid source to the tire internal space without passing through the third port, wherein an auxiliary one-way valve is placed between the arrangement and the chamber.

17. A device for adjustment of pressure in tires, comprising:

an arrangement having an interior volume in flow communication with a first port in flow communication with a fluid source, a second port in flow communication with a tire internal space to be pressurized, and a third port;

a closure element arranged to open flow communication between the third port and the second port through the arrangement when pressure in the tire internal space is above a threshold pressure and to close flow communication between the third port and the second port through the arrangement when pressure in the tire internal space is below the threshold pressure; and a chamber having walls defining the chamber that have a shape memory disposed between the second port and the tire internal space, wherein the arrangement permits fluid flow from the fluid source to the tire internal space without passing through the third port, and wherein, when the third port is open, the first port is closed.

18. The device for adjustment of pressure in tires as set forth in claim 17, comprising a one-way valve connected to the first port.

19. The device for adjustment of pressure in tires as set forth in claim 18, wherein the one-way valve permits fluid flow only in a direction from the fluid source to the arrangement.

20. The device for adjustment of pressure in tires as set forth in claim 17, wherein the closure element is arranged to open flow communication between the third port and the tire internal space when pressure in the tire internal space is above the threshold pressure and to close flow communication between the third port and the tire internal space when pressure in the tire internal space is below the threshold pressure.

21. The device for adjustment of pressure in tires as set forth in claim 17, wherein the closure element is arranged to open flow communication between the third port and the first port when pressure in the tire internal space is above the threshold pressure and to close flow communication between the third port and the first port when pressure in the tire internal space is below the threshold pressure.

22. The device for adjustment of pressure in tires as set forth in claim 11, wherein the closure element is arranged to open flow communication between the third port and the fluid source when pressure in the tire internal space is above the threshold pressure and to close flow communication between the third port and the fluid source when pressure in the tire internal space is below the threshold pressure.

23. A device for adjustment of pressure in tires, comprising:
   an arrangement having an interior volume in flow communication with a first port in flow communication with a fluid source, a second port in flow communication with a tire internal space to be pressurized, and a third port between the interior volume of the arrangement and the fluid source;
   a closure element arranged to open flow communication between the first port and the third port through the arrangement so that fluid flows from the fluid source through the first port and to the third port without flowing through the second port when pressure in the tire internal space is above a threshold pressure and to close flow communication between the first port and the third port through the arrangement when pressure in the tire internal space is below the threshold pressure.

24. The device for adjustment of pressure in tires as set forth in claim 23, wherein the closure element is arranged to open flow communication between the third port and the fluid source when pressure in the tire internal space is above the threshold pressure and to close flow communication between the third port and the fluid source when pressure in the tire internal space is below the threshold pressure.

25. The device for adjustment of pressure in tires as set forth in claim 23, comprising a one-way valve connected to the second port.

26. The device for adjustment of pressure in tires as set forth in claim 25, wherein the one-way valve permits fluid flow only in a direction from the fluid source to the tire internal space.

27. The device for adjustment of pressure in tires as set forth in claim 23, wherein the closure element is arranged to open flow communication between the third port and the first port when pressure in the tire internal space is above the threshold pressure and to close flow communication between the third port and the first port when pressure in the tire internal space is below the threshold pressure.

28. A device for adjustment of pressure in tires, comprising
   an arrangement having an interior volume in flow communication with a first port in flow communication with a fluid source, a second port, and a third port in flow communication with a tire internal space;
   a chamber having walls defining the chamber that have a shape memory and providing flow communication between the second port and the tire internal space;
   a closure element arranged to close flow communication through the arrangement from the fluid source to the second port through the first port when pressure in the tire internal space is above a threshold pressure and to open flow communication through the arrangement between the fluid source and the second port through the first port when pressure in the tire internal space is below the threshold pressure,
   wherein the arrangement permits fluid flow from the fluid source to the tire internal space without passing through the third port, and wherein, when the third tort is open, the first port is closed.

* * * * *